United States Patent
Pezzi

(10) Patent No.: US 11,340,244 B2
(45) Date of Patent: May 24, 2022

(54) METHOD AND APPARATUS FOR MAGNETIC BEAD MANIPULATION

(71) Applicant: Siemens Healthcare Diagnostics Inc., Tarrytown, NY (US)

(72) Inventor: Hannah Pezzi, Emeryville, CA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/310,620

(22) PCT Filed: Jan. 28, 2020

(86) PCT No.: PCT/US2020/015303
§ 371 (c)(1),
(2) Date: Aug. 13, 2021

(87) PCT Pub. No.: WO2020/190377
PCT Pub. Date: Sep. 24, 2020

(65) Prior Publication Data
US 2022/0043016 A1    Feb. 10, 2022

Related U.S. Application Data

(60) Provisional application No. 62/819,073, filed on Mar. 15, 2019, provisional application No. 62/819,018, filed on Mar. 15, 2019.

(51) Int. Cl.
*G01N 35/00* (2006.01)
*G01N 1/40* (2006.01)
(Continued)

(52) U.S. Cl.
CPC ............ *G01N 35/0098* (2013.01); *B03C 1/01* (2013.01); *B03C 1/0332* (2013.01); *B03C 1/286* (2013.01);
(Continued)

(58) Field of Classification Search
CPC .... G01N 35/0098; G01N 1/4077; B03C 1/01; B03C 1/0332; B03C 1/286; B03C 1/288; B03C 2201/18; B03C 2201/26
See application file for complete search history.

(56) References Cited

U.S. PATENT DOCUMENTS 5,200,084 A   4/1993 Liberti et al.
8,071,395 B2  12/2011 Davis et al.
(Continued)

FOREIGN PATENT DOCUMENTS

EP  1130397  9/2001
EP  1145010  5/2005
(Continued)

OTHER PUBLICATIONS

International Search Report for PCT/US2020/015303 dated Apr. 14, 2020.

*Primary Examiner* — Benjamin R Whatley
*Assistant Examiner* — Jean Caraballo-Leon

(57) ABSTRACT

A method and apparatus for removing magnetic beads together with molecular targets of interest from a fluid is described. A consumable bead collection probe is placed in a vessel containing magnetic beads suspended in the fluid. A magnet outside the vessel concentrates magnetic beads on a surface of the collection probe so they may be manipulated in and out of vessels during washing or processing steps without transferring the fluid into or out of a vessel. In a further embodiment, a vibrational source is attached to the collection probe such that, in combination with the magnet in a position external to the vessel, beads may be washed without releasing them from the collection probe.

24 Claims, 6 Drawing Sheets

(51) Int. Cl.
    *B03C 1/01*      (2006.01)
    *B03C 1/033*     (2006.01)
    *B03C 1/28*      (2006.01)

(52) U.S. Cl.
    CPC ........... *B03C 1/288* (2013.01); *G01N 1/4077* (2013.01); *B03C 2201/18* (2013.01); *B03C 2201/26* (2013.01)

(56) References Cited

U.S. PATENT DOCUMENTS

| | | |
|---|---|---|
| 9,012,201 B2 | 4/2015 | Korpela et al. |
| 9,568,403 B2 | 2/2017 | Tuunanen |
| 2009/0311733 A1* | 12/2009 | Korpela ........... G01N 33/54326 435/29 |
| 2012/0329124 A1 | 12/2012 | Tajima |
| 2014/0287487 A1 | 9/2014 | Campton et al. |
| 2015/0153259 A1 | 6/2015 | Liberti et al. |
| 2016/0187330 A1 | 6/2016 | Wang et al. |
| 2017/0152509 A1* | 6/2017 | Ohashi ................ C12Q 1/6806 |
| 2017/0355980 A1 | 12/2017 | Ladner et al. |

FOREIGN PATENT DOCUMENTS

| | | |
|---|---|---|
| EP | 2229441 | 10/2014 |
| EP | 1960112 | 7/2015 |
| EP | 3030353 | 5/2017 |
| WO | 1986006493 | 11/1986 |

\* cited by examiner

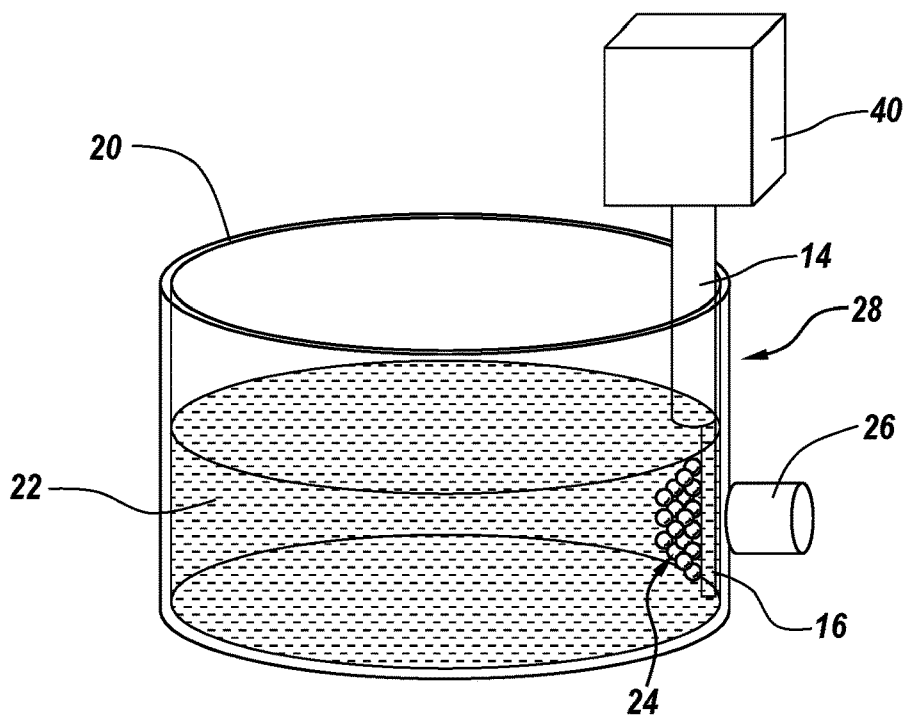
*Fig. 4*
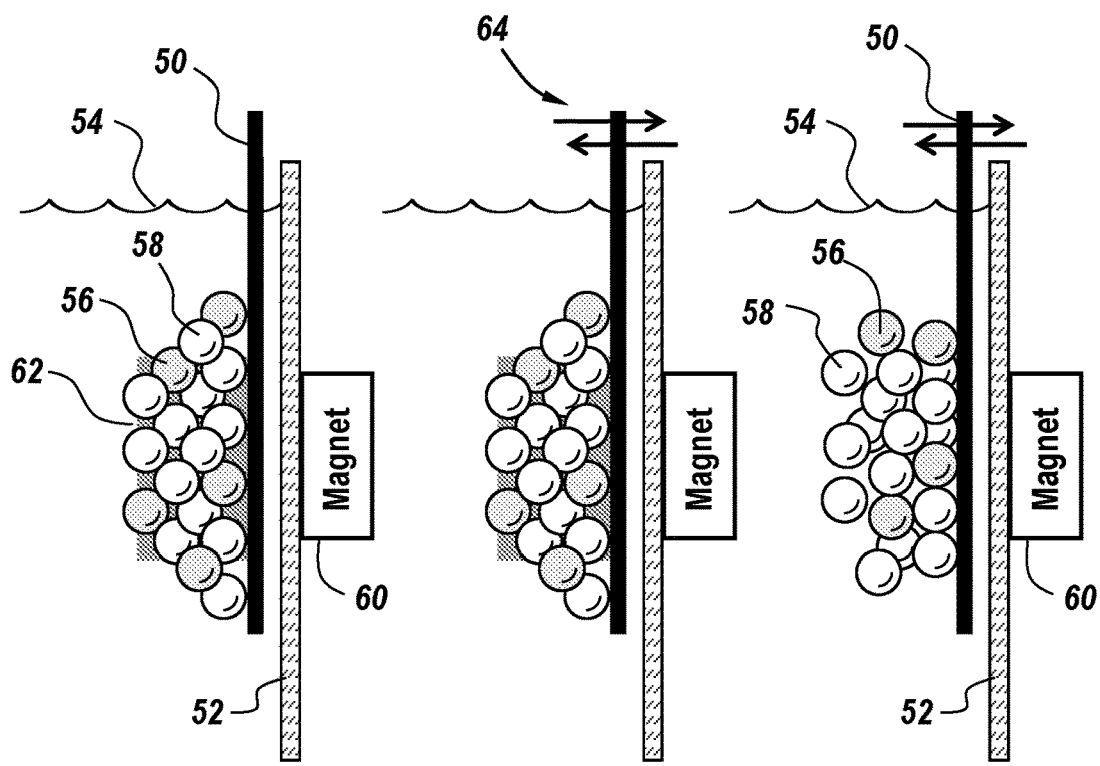
*Fig. 5A*   *Fig. 5B*   *Fig. 5C*

METHOD AND APPARATUS FOR MAGNETIC BEAD MANIPULATION

CROSS-REFERENCE TO RELATED APPLICATIONS

The present application claims priority to U.S. Provisional Patent Applications 62/819,018 filed Mar. 15, 2019 titled MAGNETICALLY IMMOBILIZED LOCAL BEAD MIXING and 62/819,073 filed Mar. 15, 2019 titled MAGNETIC BEAD PROBE-BASED TRANSFER, the contents of which are incorporated herein by reference in their entirety.

FIELD OF THE DISCLOSURE

The disclosure herein relates generally to the field of purification of sample components. More particularly, the present disclosure relates to novel devices, systems and methods for magnetic particle manipulation.

BACKGROUND

Many fields require techniques for capturing and separating targets of interest from a fluidic medium. This may include, for example, removing whole cells, protein, RNA or DNA from fluids such as blood or saliva for further analysis. Magnetic beads have become a common method for these molecular manipulations. They may be functionalized with silica surfaces, for example, to allow selective binding of molecules that are targets of interest to the magnetic beads. Based on their surface affinity, functionalized magnetic beads may be added to fluids to capture the targeted molecules. The magnetic responsiveness of the beads then allows the beads together with any captured targets to be concentrated within the fluid using a magnet. To purify targets, multiple wash steps may be necessary to remove trace amounts of fluid from both the captured targets and the magnetic beads, as well as to ensure the target is compatible with downstream analysis (for example, polymerase chain reaction or PCR).

Once magnetic beads and their captured targets are concentrated, they may be removed from one fluid and dispersed in a second fluid for washing. Bead dispersion during washing typically occurs by removing/distancing the magnet used to collect the beads, introducing physical agitation of the beads to resuspend them in the fluid (e.g., pipette mixing), and then re-collecting the beads by the magnet.

In some technologies, beads are dispersed in a fluid with a pipette. Alternatively, beads may be dispersed by using a probe with a magnet inside the probe to collect beads, then retracting the magnet out of the probe and plunging the probe up and down in a well to release the beads from the probe. Such products may then re-engage the magnet within the probe to recollect the beads and transfer them to the next well. This system results in aggregates of beads which need to be released in coordination with some physical agitation (e.g., pipette mixing) to fully disperse the magnetic beads and remove remaining fluid from the interstitial space between the beads.

Techniques for moving beads from one fluid to another as well as mixing or dispersing the beads via washing can impact washing efficiency, time, recovery, reagent volume and cost.

Thus, there is a need for improved manipulation of magnetic beads through during washing and/or processing steps. There is a further need for agitating or mixing magnetic beads in a washing process without physically releasing and dispersing the magnetic beads from a probe or collection device.

SUMMARY

In an embodiment, a bead collection probe is placed in a vessel containing magnetic beads in a fluid. A magnet outside the vessel concentrates magnetic beads on the collection probe so they may be manipulated in a fluid. In a further embodiment, a vibrational source is attached to the collection probe such that, in combination with the magnet in a position external to the vessel, beads may be washed without releasing them from the collection probe.

In an embodiment, a system for localizing magnetic beads for processes involving molecular manipulations includes a vessel for receiving an aliquot of a fluid sample and a plurality of magnetic beads therein; a bead collection probe configured to be disposed against an inner surface of a wall of the vessel; and a magnet external to the vessel for selectively establishing a magnetic field within the vessel, the plurality of magnetic beads accumulating on the bead collection probe in the presence of the established magnetic field.

In a further embodiment, the system includes an agitator in mechanical communication with at least one of the vessel and the bead collection probe for selectively agitating the vessel and/or the vessel contents while the plurality of magnetic beads remains accumulated on the bead collection probe. Further, the agitator is for selectively agitating the vessel and/or vessel contents with the magnetic field established.

In another embodiment, a mechanical translator is in communication with the bead collection probe and the magnet for selective and coordinated upwards translation of the bead collection probe, the magnet, and the established magnetic field relative to the vessel for extracting the bead collection probe with the accumulated plurality of magnetic beads from the vessel.

In another embodiment, a first mechanical translator is in communication with the magnet for selective upwards translation of the magnet and the established magnetic field for selective upwards movement of the accumulated plurality of magnetic beads on the bead collection probe. Further, a second mechanical translator is in communication with the bead collection probe for extracting the bead collection probe and the accumulated plurality of magnetic beads from the vessel after the first mechanical translator has moved the accumulated plurality of magnetic beads upwards and out of the aliquot of fluid sample.

In yet another embodiment, a mechanical translator is in communication with the vessel for selective downwards translation of the vessel relative to the bead collection probe, the magnet, the established magnetic field, and the plurality of magnetic beads accumulated on the bead collection probe.

In an embodiment, a method of extracting magnetic beads from a fluid sample for molecular manipulation includes depositing an aliquot of fluid sample within a vessel; depositing a plurality of magnetic beads within the vessel; disposing a bead collection probe within the vessel adjacent to a portion of the wall thereof; disposing a magnet proximate the vessel wall portion to which the bead collection probe is opposite and adjacent, the magnet establishing a magnetic field within the vessel; accumulating the plurality of magnetic beads on the bead collection probe under influence of the magnetic field; and moving the vessel relative to the bead collection probe and the accumulated plurality of magnetic beads thereon.

In a further embodiment, the method includes disposing an auxiliary magnet proximate a vessel wall portion opposite the vessel wall portion to which the bead collection probe is adjacent, the auxiliary magnet establishing a magnetic field within the vessel.

In another embodiment, the method includes agitating at least one of the vessel and the bead collection probe to wash the accumulated plurality of magnetic beads on the bead collection probe.

In yet another embodiment, the method includes moving the bead collection probe, the accumulated plurality of magnetic beads, and the magnet relative to the vessel to extract the accumulated plurality of magnetic beads from the aliquot of fluid sample.

In a further embodiment, the method includes moving the magnet and the established magnetic field relative to the bead collection probe and the vessel to move the accumulated plurality of magnetic beads on the bead collection probe out of the aliquot of fluid sample. Further, the method may include removing the magnet and the established magnetic field from the vessel and the bead collection probe, the plurality of magnetic beads remaining accumulated on the bead collection probe. The method may also include moving the bead collection probe and the accumulated magnetic beads out of the vessel.

In another embodiment, the method includes moving the vessel relative to the bead collection probe, the magnet, the established magnetic field, and the accumulated plurality of magnetic beads to extract the accumulated plurality of magnetic beads from the aliquot of fluid sample. Further, the method may include moving the bead collection probe and the accumulated plurality of magnetic beads from the vessel. Yet further, the method may include removing the magnet and the established magnetic field from the vessel and the bead collection probe, the plurality of magnetic beads remaining accumulated on the bead collection probe.

In an embodiment, a system for collecting and washing magnetic beads includes a vessel for receiving an aliquot of a liquid sample and a plurality of magnetic beads therein; a bead collection probe disposed within the vessel adjacent to a portion of the wall thereof; a magnet proximate the vessel wall portion to which the bead collection probe is opposite and adjacent for establishing a magnetic field within the vessel, the plurality of magnetic beads accumulating on the bead collection probe in the presence of the established magnetic field; and an agitator in mechanical communication with at least one of the vessel and the bead collection probe for selectively agitating the vessel and/or the vessel contents.

In a further embodiment, the agitator is for selectively agitating the vessel and/or vessel contents in the absence of the established magnetic field. Further, agitator may selectively agitating the vessel and/or vessel contents with the magnetic field established.

In another embodiment, the agitator is for selectively agitating the aliquot of fluid sample while the plurality of magnetic beads remains accumulated on the bead collection probe. Further, the selective agitation may result in movement of the plurality of magnetic beads relative to each other while accumulated on the bead collection probe.

In a further embodiment, the system includes a pipette for selectively extracting the aliquot of fluid sample from the vessel after the selective agitation with the plurality of magnetic beads accumulated on the bead collection probe.

Further, the system includes a source of wash fluid for injecting a quantity of wash fluid into the vessel after the aliquot of fluid sample has been extracted from the vessel.

In yet another embodiment, the system includes a mechanical translator in communication with at least one of the bead collection probe, the magnet, and the vessel for separating the bead collection probe, with the plurality of magnetic beads accumulated thereon, from the vessel.

In an embodiment, a method for extracting magnetic beads within a vessel containing a fluid sample includes depositing an aliquot of the fluid sample within the vessel; depositing a plurality of magnetic beads within the vessel; disposing a bead collection probe within the vessel adjacent to a portion of the wall thereof; disposing a magnet proximate the vessel wall portion to which the bead collection probe is opposite and adjacent, and agitating at least one of the vessel and the bead collection probe to wash the plurality of magnetic beads, whereby the plurality of magnetic beads accumulates on the bead collection probe under influence of a magnetic field associated with the magnet and remains accumulated prior to, during, and after agitation.

In another embodiment, the method includes disposing an auxiliary magnet proximate a vessel wall portion opposite the vessel wall portion to which the bead collection probe is adjacent, the auxiliary magnet establishing a magnetic field within the vessel.

In another embodiment, the method includes pipetting the aliquot of fluid sample from the vessel after agitation. Further, the method may include extracting the bead collection probe and the plurality of magnetic beads accumulated thereon after pipetting.

In a further embodiment, the agitating is performed by an agitator mechanically connected to a portion of the vessel. Further, the agitating may be performed by an agitator mechanically connected to a portion of the bead collection probe.

In another embodiment, the agitating is performed at or below an intensity at which the magnetic beads of the plurality of magnetic beads move relative to each other while remaining accumulated on the bead collection probe. Further, the agitating occurs prior to disposing the magnet proximate to the vessel wall. Yet further, the agitating occurs after disposing the magnet proximate to the vessel wall.

BRIEF DESCRIPTION OF THE DRAWINGS

Illustrative embodiments of the disclosed technology are described in detail below with reference to the attached drawing figures, wherein:

FIG. 4 illustrates a system for mixing magnetic beads in the vessel of FIG. 2A.

FIGS. 5A-5C illustrate a more detailed view of the mixing process provided by the system of FIG. 4.

DETAILED DESCRIPTION

Magnetic beads may be used to capture molecular targets of interest and separate them from a fluid, for example, a body fluid. Magnetic beads may be designed to bind with molecules that are targets of interest, then added to a vessel containing fluid to capture targeted molecules. A magnet external to the vessel may be used to accumulate the beads on a probe, together with any captured targets, for subsequent processing. Separating the magnetic beads with their accumulated targets from the fluid may leave trace amounts of fluid on the targets, which may require multiple wash steps to purify the targets for further analysis. A quantity of fluid in a vessel may be an aliquot of a fluid sample.

Embodiments of an apparatus and method for molecular manipulation of magnetic beads using a bead collection probe are disclosed herein. References to magnetic beads herein encompasses both magnetic beads and magnetic beads with captured targets. Common reference numbers indicate common elements throughout the figures.

Figure 1A:
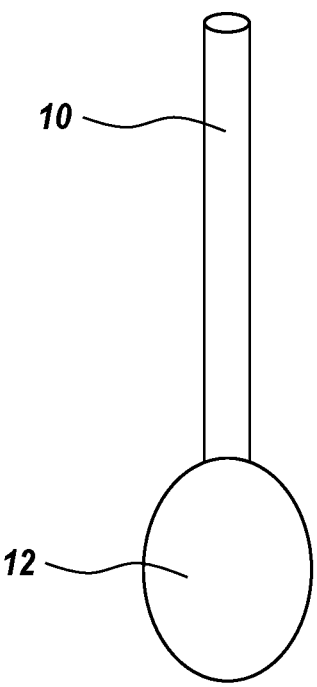
FIGS. 1A-1D illustrate a variety of collection probes according to the present disclosure.
Figure 1B:
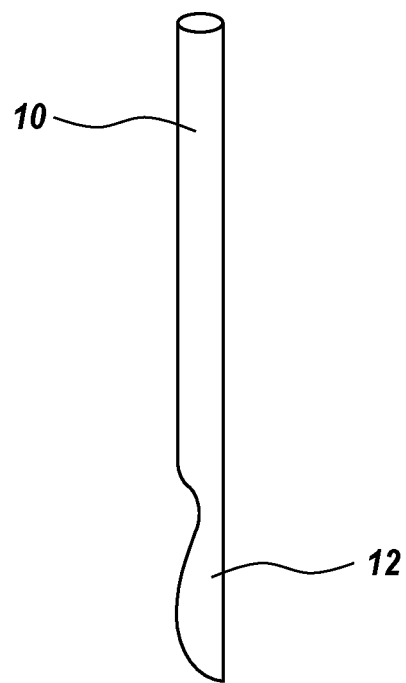

FIGS. 1A-1D illustrate several exemplary embodiments of a bead collection probe. Although specific geometries are shown, this is for the purposes of illustration only. Many different shapes and configurations may be used without departing from the teachings of the present disclosure. FIG. 1A is a front view and FIG. 1B is a side view of a bead collection probe 10. In an embodiment, probe 10 is made from a consumable material intended for single use applications such as a polymer material. A collection surface 12 of probe 10 is generally circular and slightly curved inwardly from side to side. Such a convex curve may match the interior curvature of a vessel in which the probe is intended for use. In an alternative embodiment, collection surface may have a different shape such as rectangular or oblong.

Figure 1C:
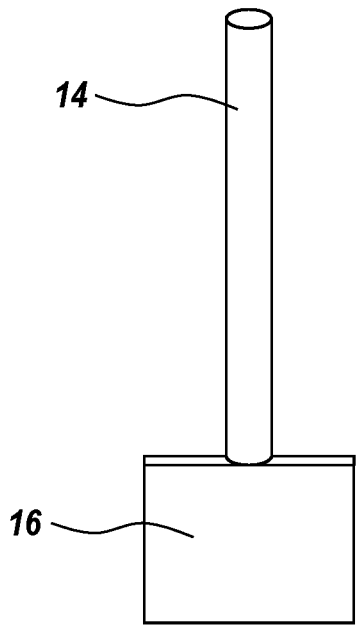
Figure 1D:
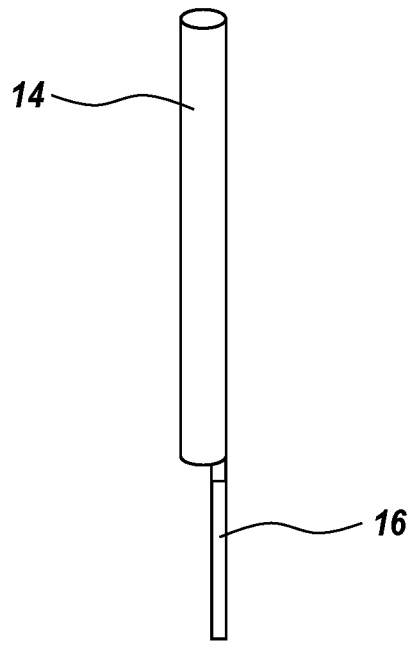

FIG. 1C is a front view and FIG. 1D is a side view of a bead collection probe 14. In an embodiment, collection surface 16 of probe 14 is rectangular and flat. As noted above, a variety of shapes and curvatures may be used for collection surface 16. In further embodiments, both probes 10 and 14 may include stems that are hollow or solid.

Figure 2A:
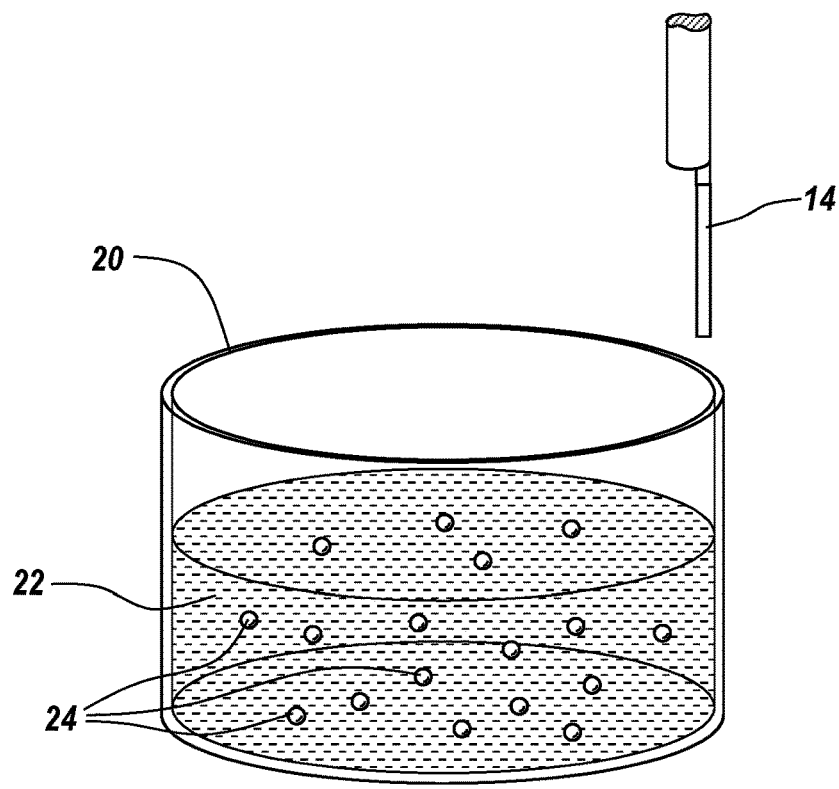
FIG. 2A illustrates a vessel containing a fluid to be analyzed with a quantity of magnetic beads suspended therein.

FIG. 2A illustrates a vessel 20 holding a quantity of fluid 22 to be analyzed. A quantity of magnetic beads 24 are suspended in fluid 22. Probe 14 is positioned above and close to an inner surface wall of vessel 20. Although probe 14 is shown in subsequent figures, any suitable probe such as those described above in connection with FIGS. 1A-1D may be used. Probe 14 may be inserted into vessel 20 by lowering probe 14 into a vessel 20 which is stationary, raising vessel 20 while probe 14 is stationary, or a combination of both movements to provide, for example, a selective and coordinated upwards and/or downwards translation of the bead collection probe, the magnet, and the established magnetic field. In an embodiment, vessel 20 may be any shape suitable for containing a fluid, including cylindrical and square, for example. In addition, the side of vessel 20 may be flat or curved. In a further embodiment, vessel 20 may also have a bottom surface that is curved or pointed instead of flat, as shown.

Figure 2B:
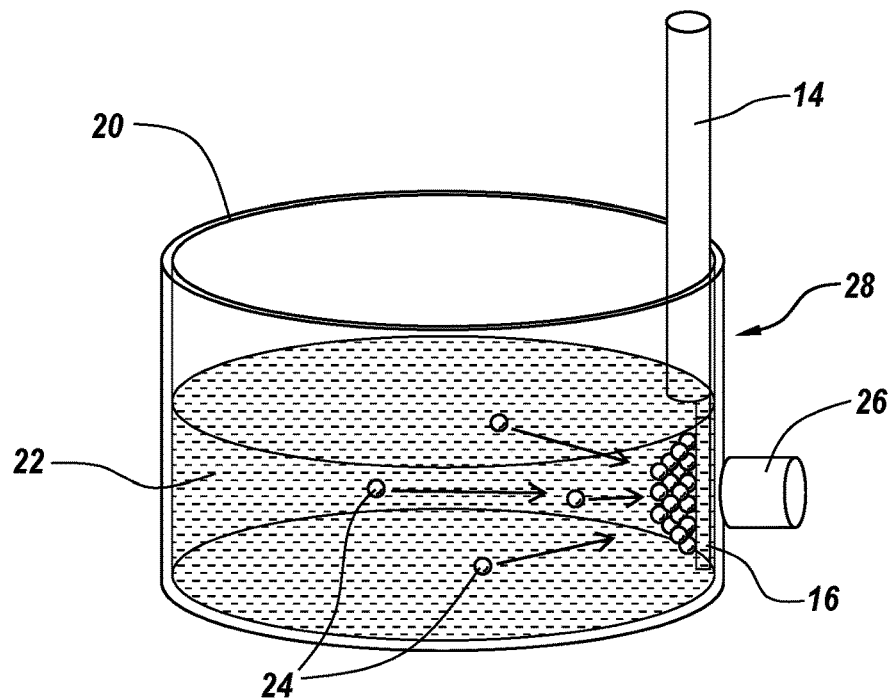
FIG. 2B illustrates the vessel of FIG. 2A with a collection probe.

FIG. 2B illustrates vessel 20 of FIG. 2A wherein probe 14 has been inserted into vessel 20 close to the vessel wall 28. In an embodiment, magnet 26 is located against or adjacent to wall 28 and proximate to collection surface 16 of probe 14. A magnetic field generated by magnet 26 causes magnetic beads 24 to be drawn to collection surface 16 and held thereon.

Figure 3A:
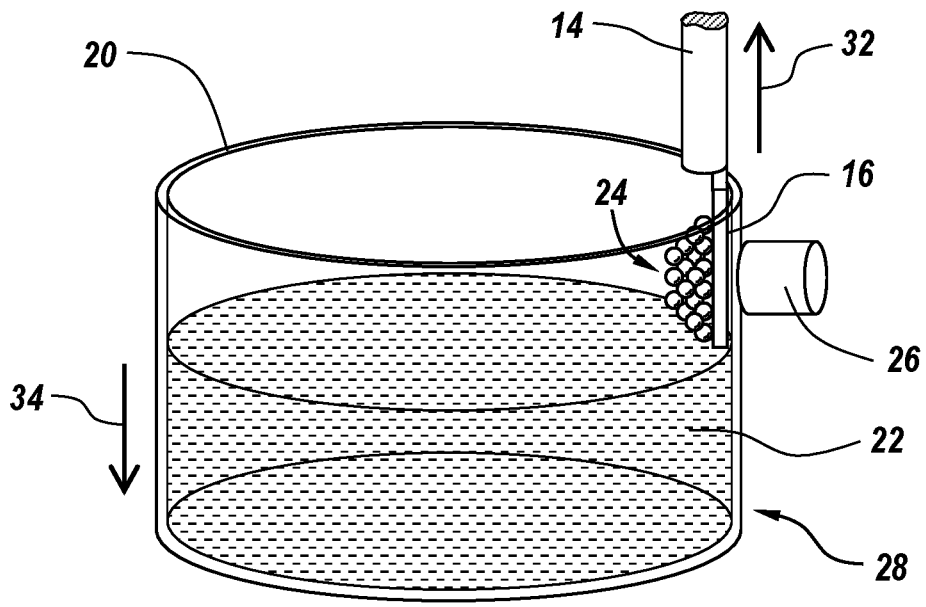
FIGS. 3A and 3B illustrate systems for the removal of magnetic beads from the vessel of FIG. 2A.
Figure 3B:
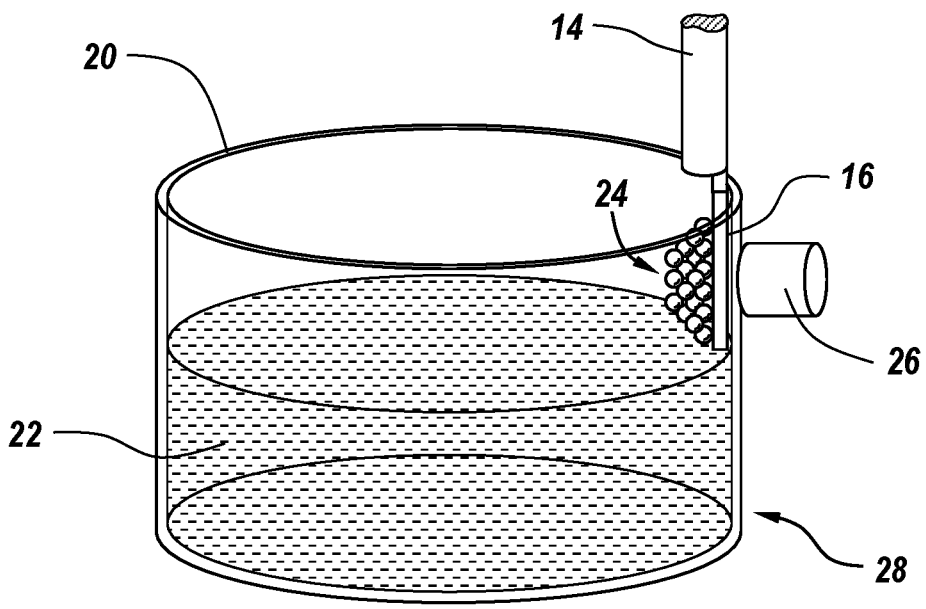

FIGS. 3A-3B illustrate vessel 20 during removal of magnetic beads 24 from fluid 22. Both probe 14 and magnet 26 may be moved together or independently relative to fluid 22. In FIG. 3A, removal of magnetic beads 24 may be accomplished in several ways. For example, magnetic beads 24 may be removed by moving probe 14 and magnet 26 upwards as shown by arrow 32, by moving vessel 20 downwards as shown by arrow 34 while maintaining probe 14 and magnet 26 in place, or by a combination of both movements. In an embodiment, a mechanical translator may be in communication with the probe or the vessel. In another embodiment, first and second mechanical translators may be in communication with the probe and the vessel, respectively. Additional mechanical translators may also be provided. As probe 14 is removed from fluid 22, magnet 26 is maintained in a position proximate collection surface 16 of probe 14, and against or adjacent to vessel wall 28 on the outside of the vessel, thus the magnetic field generated by magnet 26 causes magnetic beads to be retained against collection surface 16 as the beads are removed from the fluid.

FIG. 3B illustrates another embodiment of removing magnetic beads 24 from fluid 22. In this embodiment, both vessel 20 and probe 14 are held substantially stationary while magnet 26 is moved along vessel wall 28, remaining in proximity to probe 14. The magnetic field generated by magnet 26 causes magnetic beads 24 to stay in contact with probe 14 as they travel along the probe to exit fluid 22. In an embodiment, collection surface 16 of probe 14 may be lengthened so that it extends above and below the surface of fluid 22.

Once removed from fluid 22, probe 14 may be removed from the vessel entirely, with or without moving the magnet 26. To accomplish this, the relative positions of the probe 14 and magnet 26 remain in proximity long enough for magnetic beads 24 to exit the fluid. Once free of the fluid, magnet 26 may be removed and probe 14 may be freely moved with the collected beads as the beads would remain on probe 14. Probe 14 may then be moved (free of any magnet) to a new fluid filled vessel (e.g., another wash buffer).

During processing, magnetic beads and their captured targets may be subjected to multiple washing steps where they are placed into a fluid, agitated, then removed again. Embodiments above disclose a method of removing magnetic beads from a fluid. In a further embodiment, magnetic beads may be placed in a fluid and washed by agitation without releasing the magnetic beads from the bead collection probe.

FIG. 4 illustrates an embodiment of a bead collection probe and system for washing magnetic beads without releasing them from a probe. Probe 14 is inserted into fluid 22 inside vessel 20. Magnet 26 is used to collect and accumulate magnetic beads 24 against collection surface 16 of probe 14. An agitator 40 is in mechanical communication with probe 14. In an embodiment, agitator 40 may be any device capable of imparting motion to probe 14. During a washing step, agitator 40 imparts a vibration to probe 14. Vibration parameters are chosen to result in an intensity of vibration that causes magnetic beads 24 to move relative to each other without being released from collection surface 16 due to the magnetic field established by magnet 26. In embodiments, agitator 40 may selectively agitate the probe in the absence of a magnetic field established by magnet 26.

FIGS. 5A-5C illustrate the mixing process provided in association with the embodiment of FIG. 4. However, the mixing process as described below may be used with any embodiment as described above. Collection surface 50 of a probe such as probe 14 of FIG. 1C is inserted into a vessel as shown in FIG. 4 alongside vessel wall 52 and below the surface of a fluid as indicated at 54. A quantity of magnetic beads represented by 56, 58 are held against collection surface 50 by a magnetic field generated by magnet 60 on or proximate to an outer surface of vessel wall 52. Distinctions between individual beads as shown are for purposes of illustrating the method of mixing and do not necessarily indicate differences in the composition of the beads.

In FIG. 5A, magnetic beads 56 have been removed from a first fluid (or fluid has been removed from the vessel) but still retain a carryover quantity of interstitial fluid 62. In FIG. 5B, collection surface 50 is caused to vibrate by an agitator 40 such as shown in FIG. 4. A direction of vibration is shown by arrows 64. Although a side to side vibration is shown by arrows 64, in an alternative embodiment, the probe and collection surface may be vibrated in an up and down direction, circularly, or any other range of motion.

As shown in FIG. 5C, the vibration imparted to probe/collection surface 50 results in movement of magnetic beads relative to their original location, as indicated by the change in position of magnetic beads 56 and 58 between FIGS. 5A and 5C. As the magnetic beads are moved, the agitation also results in a release of interstitial fluid 62. The mixing process is performed without releasing magnetic beads into the fluid.

Figure 6:
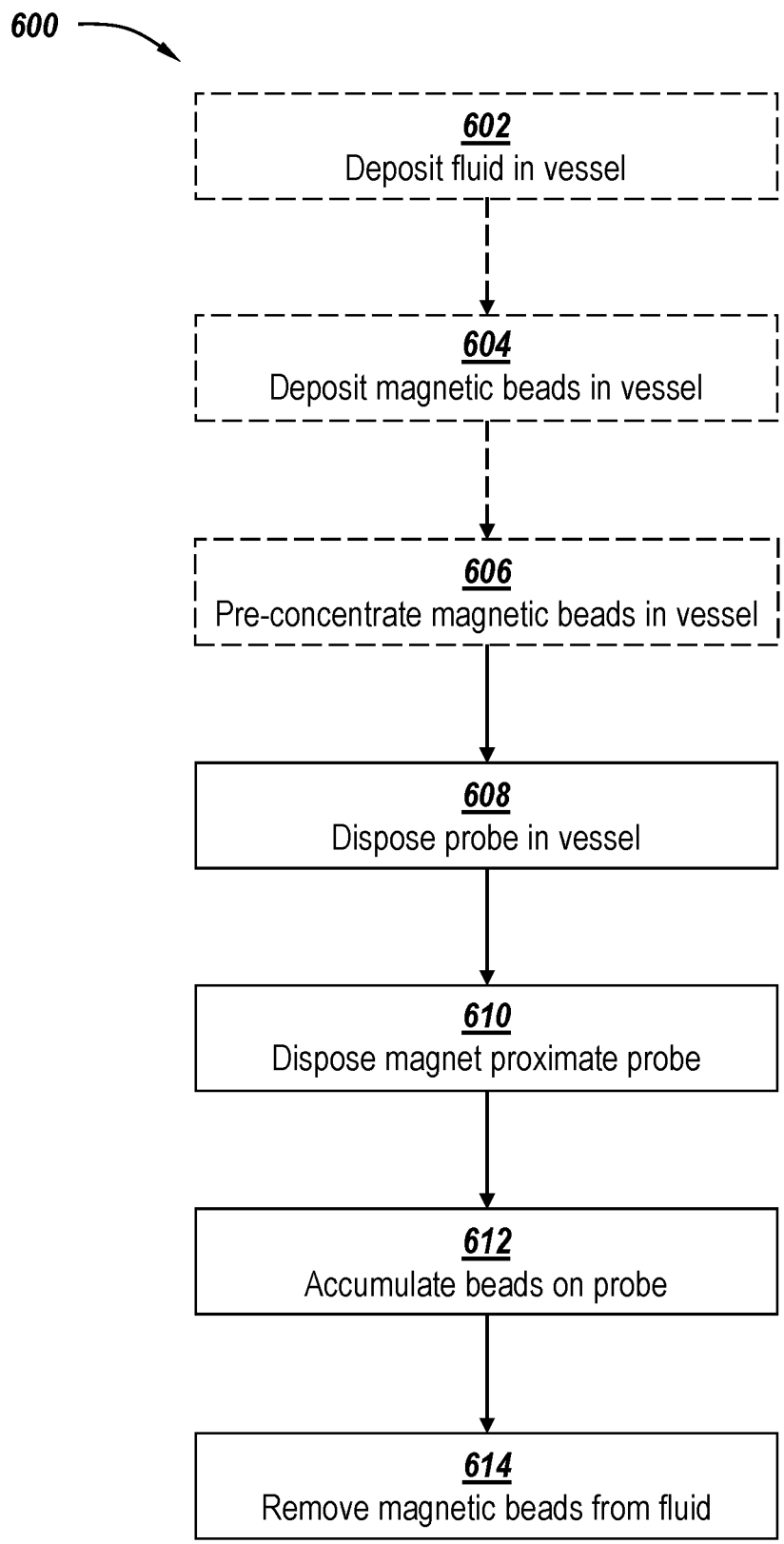
FIG. 6 is a flowchart of a process for removing magnetic beads from a fluid, according to embodiments.

FIG. 6 is a flowchart illustrating a method 600 for process for removing magnetic beads from a fluid as depicted, for example, in FIG. 3A or 3B. Method 600 includes steps 608, 610, 612 and 614. In embodiments, method 600 includes at least one of steps 602, 604 and 606.

Step 602 includes depositing fluid in a vessel. In an example of step 602, an aliquot of a fluid sample is deposited. The fluid may be any fluid containing a target molecule of interest. Step 604 includes depositing a plurality of magnetic beads within the vessel. In an example of step 604, magnetic beads may be a variety of sizes and may be coated with a functionalized silica surface, for example, to provide binding of molecules that are targets of interest to the magnetic beads. Steps 602 and 604 may be performed in either temporal order, or substantially simultaneously.

Step 606 includes preconcentrating magnetic beads in the vessel. In an example of step 606, a magnet is position adjacent to the vessel opposite the side where the probe will be or has already been inserted. In embodiments, step 606 may be performed before or after step 608.

Step 608 includes disposing a bead collection probe within the vessel. In an example of step 608, a bead collection probe may take any of the forms described as shown in FIGS. 1A-1D and is placed in a vessel at a location adjacent to a portion of a wall of the vessel.

Step 610 includes disposing a magnet proximate the probe. In an example of step 610, a magnet is placed outside the vessel wall portion to which the bead collection probe is opposite and adjacent, the magnet establishing a magnetic field within the vessel.

Step 612 includes accumulating magnetic beads on the probe. In an example of step 612, a plurality of magnetic beads is collected on the bead collection probe under influence of the magnetic field established by the magnet in step 610.

Step 614 includes removing the collected magnetic beads from the fluid. In an example of step 614, the bead collection probe and accumulated plurality of magnetic beads are removed by moving the vessel relative to the bead collection probe, moving the bead collection probe relative to the vessel, or a combination of both movements.

Figure 7:
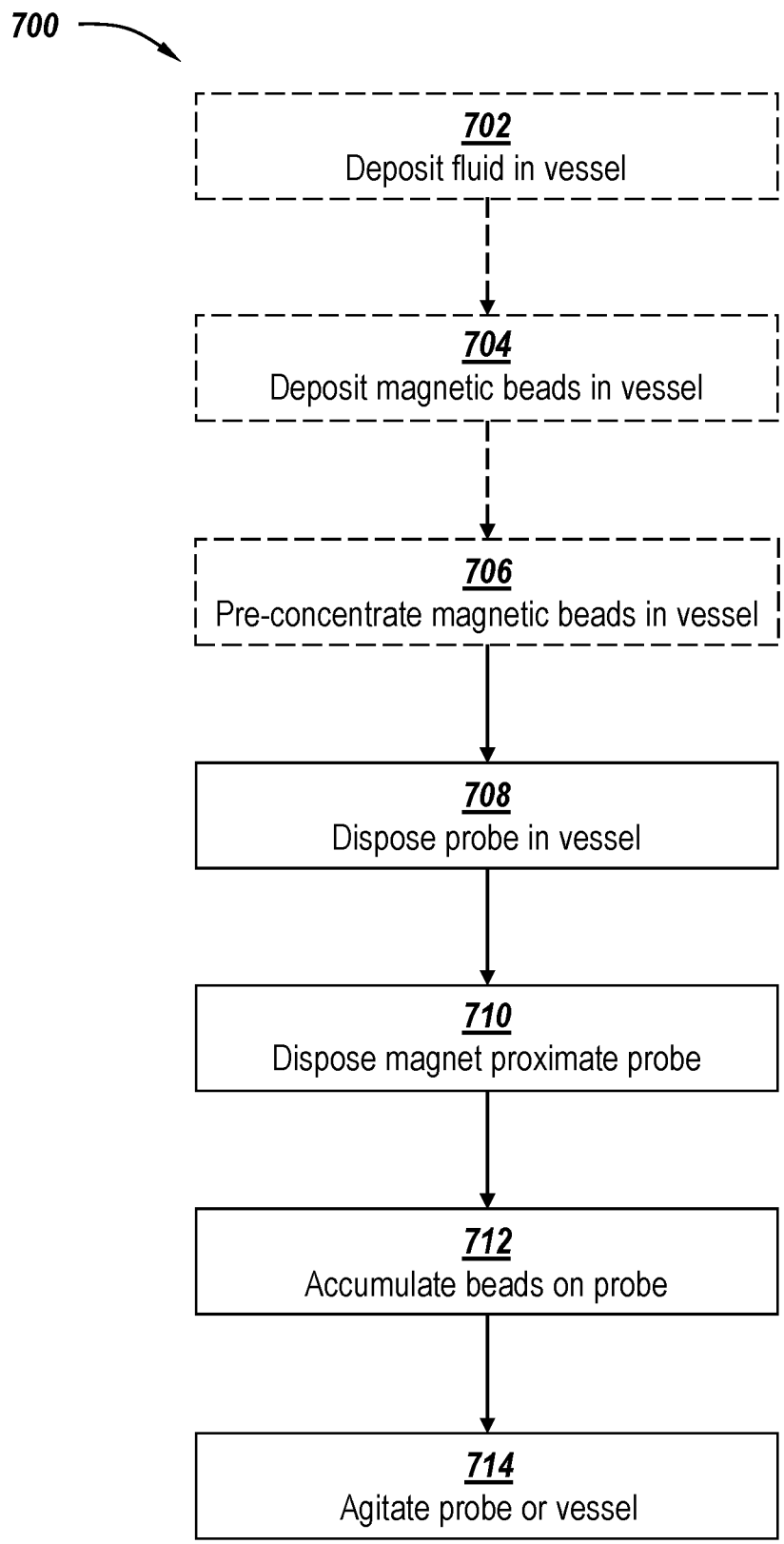
FIG. 7 is a flowchart of a process for mixing magnetic beads in a fluid, according to embodiments.

FIG. 7 is a flowchart illustrating a method 700 for process for mixing magnetic beads in a fluid as depicted, for example, in FIG. 4. Method 700 includes steps 708, 710, 712 and 714. In embodiments, method 700 includes at least one of steps 702, 704 and 706.

Step 702 includes depositing fluid in a vessel. In an example of step 702, an aliquot of a fluid sample is deposited. The fluid may be any fluid containing a target molecule of interest. Step 704 includes depositing a plurality of magnetic beads within the vessel. In an example of step 702, magnetic beads may be a variety of sizes and may be coated with a functionalized silica surface, for example, to provide binding of molecules that are targets of interest to the magnetic beads. Steps 702 and 704 may be performed in either temporal order, or substantially simultaneously.

Step 706 includes preconcentrating magnetic beads in the vessel. In an example of step 706, a magnet is position adjacent to the vessel opposite the side where the probe will be or has already been inserted. In embodiments, step 706 may be performed before or after step 708.

Step 708 includes disposing a bead collection probe within the vessel. In an example of step 708, a bead collection probe may take any of the forms described as shown in FIGS. 1A-1D and is placed in a vessel at a location adjacent to a portion of a wall of the vessel.

Step 710 includes disposing a magnet proximate the probe. In an example of step 710, a magnet is placed outside the vessel wall portion to which the bead collection probe is opposite and adjacent, the magnet establishing a magnetic field within the vessel.

Step 712 includes accumulating magnetic beads on the probe. In an example of step 712, a plurality of magnetic beads is collected on the bead collection probe under influence of the magnetic field established by the magnet in step 710.

Step 714 includes agitating at least one of the vessel and the bead collection probe. In an example of step 714, agitation of at least one of the vessel or bead collection probe causes the magnetic beads accumulated on the probe to move relative to each other and release interstitial fluid from the beads, thereby washing the beads. The plurality of magnetic beads accumulates on the bead collection probe under influence of a magnetic field associated with the magnet and remains accumulated prior to, during, and after agitation.

Embodiments described above provide several advantages. The provision of a magnetic force from outside the vessel means that magnetic beads may be collected and/or focused to a relatively small area resulting in a much smaller probe. This results in less fluid carryover between washing steps and therefore, a quicker and more efficient wash process. A further advantage is that the magnet and consumable probe may be independently controlled. This simplifies automation and actuation of the magnet and probe in the system. Both advantages serve to improve and simplify magnetic bead extraction. Furthermore, the embodiments disclosed enable magnetic beads to be manipulated from the fluid which is much faster than handling the fluid itself. Without the need to handle the fluid, the buffers can be pre-filled and disposed after use; this eliminates the need to transfer the fluid volumes in and out of the tubes by pipette to perform sequential washes, thus reducing processing time.

In an embodiment, magnetic beads may be concentrated within a fluid using a magnet as described above, but instead of removing magnetic beads from the fluid, the fluid may be aspirated and replaced with fresh fluid, such as wash fluid, thus avoiding the risk of inadvertent fluid spillage during cross-over between successive wash vessels.

Further advantages of the above embodiments include mixing magnetic beads without fully dispersing them in the fluid. This may result in less time for bead washing because the beads do not need to be released from a probe, resuspended, mixed and then recollected on the probe. Furtherer, the probe does not need to be raised and lowered in the vessel, or moved between vessels. A further advantage is that agitation provides effective mixing of the beads in a very localized area and does not disrupt the fluid, so that the vessel does not need to be covered or capped.

Other variations and modifications may be made to the described embodiments, with the attainment of some or all their advantages. It will be further appreciated by those of ordinary skill in the art that modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

Many changes in the details, materials, and arrangement of parts and steps, herein described and illustrated, can be made by those skilled in the art in light of teachings contained hereinabove. It will be understood that certain features and sub-combinations are of utility and may be employed without reference to other features and sub combinations and are contemplated within the scope of the claims. Accordingly, it will be understood that the following claims are not to be limited to the embodiments disclosed herein and can include practices other than those specifically described, and are to be interpreted as broadly as allowed under the law. Additionally, not all steps listed in the various figures need be carried out in the specific order described.

What is claimed is:

1. A system for localizing magnetic beads for processes involving molecular manipulations, comprising:
    a vessel for receiving an aliquot of a fluid sample and a plurality of magnetic beads therein;
    a bead collection probe configured to be disposed against an inner surface of a wall of the vessel;
    a magnet external to the vessel for selectively establishing a magnetic field within the vessel, the plurality of magnetic beads accumulating on the bead collection probe in the presence of the established magnetic field; and
    a mechanical translator in communication with the bead collection probe and the magnet for selective and coordinated upwards translation of the bead collection probe, the magnet, and the established magnetic field relative to the vessel for extracting the bead collection probe with the accumulated plurality of magnetic beads from the vessel.

2. The system of claim 1, further comprising an agitator in mechanical communication with at least one of the vessel and the bead collection probe for selectively agitating the vessel and/or the vessel contents while the plurality of magnetic beads remains accumulated on the bead collection probe.

3. The system of claim 2, wherein the agitator is for selectively agitating the vessel and/or vessel contents with the magnetic field established.

4. The system of claim 1, wherein the mechanical translator further comprises:
    a first mechanical translator in communication with the magnet for selective upwards translation of the magnet and the established magnetic field for selective upwards movement of the accumulated plurality of magnetic beads on the bead collection probe; and
    a second mechanical translator in communication with the bead collection probe for extracting the bead collection probe and the accumulated plurality of magnetic beads from the vessel after the first mechanical translator has moved the accumulated plurality of magnetic beads upwards and out of the aliquot of fluid sample.

5. The system of claim 1, further comprising a mechanical translator in communication with the vessel for selective downwards translation of the vessel relative to the bead collection probe, the magnet, the established magnetic field, and the plurality of magnetic beads accumulated on the bead collection probe.

6. A method of extracting magnetic beads from a fluid sample for molecular manipulation, comprising:
    depositing an aliquot of fluid sample within a vessel;
    depositing a plurality of magnetic beads within the vessel;
    disposing a bead collection probe within the vessel adjacent to a portion of the wall thereof;
    disposing a magnet proximate the vessel wall portion to which the bead collection probe is opposite and adjacent, the magnet establishing a magnetic field within the vessel;
    accumulating the plurality of magnetic beads on the bead collection probe under influence of the magnetic field;
    moving the vessel relative to the bead collection probe and the accumulated plurality of magnetic beads thereon; and
    moving the bead collection probe, the accumulated plurality of magnetic beads, and the magnet relative to the vessel to extract the accumulated plurality of magnetic beads from the aliquot of fluid sample.

7. The method of claim 6, further comprising disposing an auxiliary magnet proximate a vessel wall portion opposite the vessel wall portion to which the bead collection probe is adjacent, the auxiliary magnet establishing a magnetic field within the vessel.

8. The method of claim 6, further comprising removing the magnet and the established magnetic field from the vessel and the bead collection probe, the plurality of magnetic beads remaining accumulated on the bead collection probe.

9. The method of claim 8, further comprising moving the bead collection probe and the accumulated magnetic beads out of the vessel.

10. A system for collecting and washing magnetic beads, comprising:
    a vessel for receiving an aliquot of a liquid sample and a plurality of magnetic beads therein;
    a bead collection probe disposed within the vessel adjacent to a portion of the wall thereof;
    a magnet proximate the vessel wall portion to which the bead collection probe is opposite and adjacent for establishing a magnetic field within the vessel, the plurality of magnetic beads accumulating on the bead collection probe in the presence of the established magnetic field;

an agitator in mechanical communication with at least one of the vessel and the bead collection probe for selectively agitating the vessel and/or the vessel contents; and a mechanical translator in communication with at least one of the bead collection probe, the magnet, and the vessel for separating the bead collection probe, with the plurality of magnetic beads accumulated thereon, from the vessel.

11. The system of claim 10, wherein the agitator is for selectively agitating the vessel and/or vessel contents in the absence of the established magnetic field.

12. The system of claim 10, wherein the agitator is for selectively agitating the vessel and/or vessel contents with the magnetic field established.

13. The system of claim 10, wherein the agitator is for selectively agitating the aliquot of fluid sample while the plurality of magnetic beads remains accumulated on the bead collection probe.

14. The system of claim 10, wherein the selective agitation results in movement of the plurality of magnetic beads relative to each other while accumulated on the bead collection probe.

15. The system of claim 10, further comprising a pipette for selectively extracting the aliquot of fluid sample from the vessel after the selective agitation with the plurality of magnetic beads accumulated on the bead collection probe.

16. The system of claim 15, further comprising a source of wash fluid for injecting a quantity of wash fluid into the vessel after the aliquot of fluid sample has been extracted from the vessel.

17. A method for extracting magnetic beads within a vessel containing a fluid sample, comprising:

depositing an aliquot of the fluid sample within the vessel;
depositing a plurality of magnetic beads within the vessel;
disposing a bead collection probe within the vessel adjacent to a portion of the wall thereof;
disposing a magnet proximate the vessel wall portion to which the bead collection probe is opposite and adjacent, and
agitating at least one of the vessel and the bead collection probe to wash the plurality of magnetic beads, wherein the agitating is performed at or below an intensity at which the magnetic beads of the plurality of magnetic beads move relative to each other while remaining accumulated on the bead collection probe; and
whereby the plurality of magnetic beads accumulates on the bead collection probe under influence of a magnetic field associated with the magnet and remains accumulated prior to, during, and after agitation.

18. The method of claim 17, further comprising disposing an auxiliary magnet proximate a vessel wall portion opposite the vessel wall portion to which the bead collection probe is adjacent, the auxiliary magnet establishing a magnetic field within the vessel.

19. The method of claim 17, further comprising pipetting the aliquot of fluid sample from the vessel after agitation.

20. The method of claim 19, further comprising extracting the bead collection probe and the plurality of magnetic beads accumulated thereon after pipetting.

21. The method of claim 17, wherein the agitating is performed by an agitator mechanically connected to a portion of the vessel.

22. The method of claim 17, wherein the agitating is performed by an agitator mechanically connected to a portion of the bead collection probe.

23. The method of claim 17, wherein the agitating occurs prior to disposing the magnet proximate to the vessel wall.

24. The method of claim 17, wherein the agitating occurs after disposing the magnet proximate to the vessel wall.

\* \* \* \* \*